United States Patent
Reytier et al.

(10) Patent No.: US 9,920,437 B2
(45) Date of Patent: Mar. 20, 2018

(54) METHOD FOR HIGH-TEMPERATURE ELECTROLYSIS OF STEAM AND ANOTHER GAS, RELATED INTERCONNECTOR, ELECTROLYSIS REACTOR AND OPERATING METHODS

(71) Applicant: COMMISSARIAT A L'ENERGIE ATOMIQUE ET AUX ENERGIES ALTERNATIVES, Paris (FR)

(72) Inventors: Magali Reytier, Villard de Lans (FR); Jérôme Aicart, Grenoble (FR); Jérôme Laurencin, Sassenage (FR); Marie Petitjean, Grenoble (FR); Michel Planque, Seyssins (FR); Philippe Szynal, Aix-les-Bains (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 234 days.

(21) Appl. No.: 14/653,147

(22) PCT Filed: Dec. 13, 2013

(86) PCT No.: PCT/IB2013/060936
§ 371 (c)(1),
(2) Date: Jun. 17, 2015

(87) PCT Pub. No.: WO2014/097101
PCT Pub. Date: Jun. 26, 2014

(65) Prior Publication Data
US 2015/0329979 A1    Nov. 19, 2015

(30) Foreign Application Priority Data
Dec. 17, 2012  (FR) ...................... 12 62174

(51) Int. Cl.
*C25B 1/00* (2006.01)
*C25B 1/10* (2006.01)
(Continued)

(52) U.S. Cl.
CPC ................. *C25B 1/00* (2013.01); *C25B 1/06* (2013.01); *C25B 1/10* (2013.01); *C25B 9/04* (2013.01);
(Continued)

(58) Field of Classification Search
CPC .... C25B 1/00; C25B 1/06; C25B 1/10; C25B 9/08; C25B 9/04; C25B 9/18; H01M 8/2425; Y02E 60/366
See application file for complete search history.

(56) References Cited

U.S. PATENT DOCUMENTS

2002/0055028 A1   5/2002   Ghosh et al.
2009/0090637 A1   4/2009   Hartvigsen et al.
(Continued)

FOREIGN PATENT DOCUMENTS

FR   2 125 729 A5   9/1972
FR   2 957 360 A1   9/2011

OTHER PUBLICATIONS

Ebesen et al., Co-Electrolysis of Steam and Carbon Dioxide in Solid Oxide Cells, "Journal of the Electrochemical Society", vol. 159, 2012, pp. F482-F489.
(Continued)

Primary Examiner — Arun S Phasge
(74) Attorney, Agent, or Firm — Oliff PLC

(57) ABSTRACT

A method for high-temperature electrolysis of steam and another gas to be electrolyzed, chosen from carbon dioxide and nitrogen dioxide, implemented in an electrolysis reactor includes a stack of elementary electrolysis cells each made of a cathode, an anode and an electrolyte inserted between
(Continued)

Figure 1:
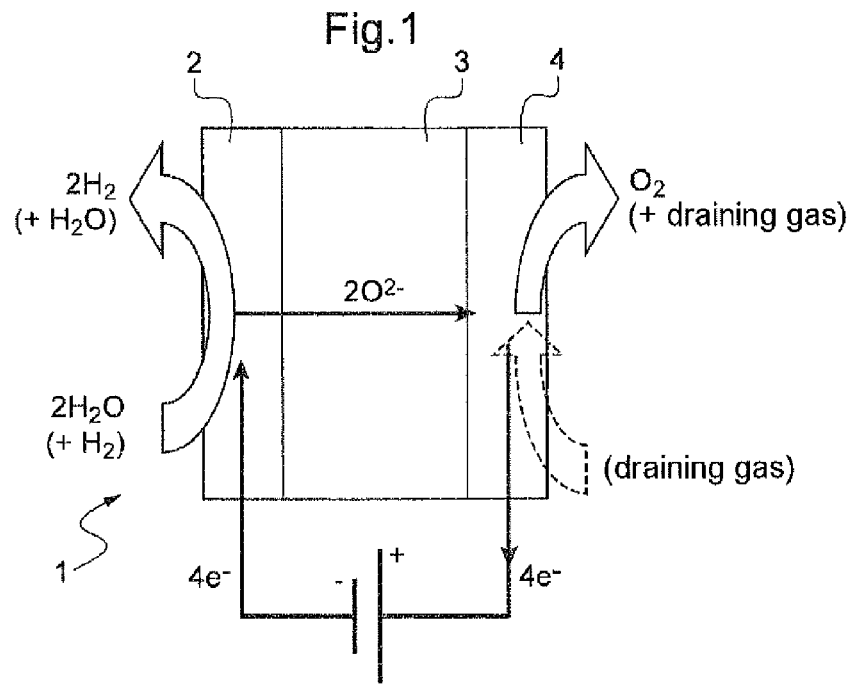

the cathode and the anode, and a plurality of electric and fluid interconnectors each arranged between two adjacent elementary cells with one of the surfaces thereof in electric contact with the anode of one of the two elementary cells and the other one of the surfaces thereof in electric contact with the cathode of the other one of the two elementary cells. The steam is supplied and distributed to the cathode of one of the two adjacent elementary cells and either carbon dioxide or nitrogen dioxide is supplied and distributed to the cathode of the other one of the two elementary cells.

21 Claims, 8 Drawing Sheets

(51) Int. Cl.
| | | |
|---|---|---|
| | *C25B 9/08* | (2006.01) |
| | *C25B 1/06* | (2006.01) |
| | *C25B 9/04* | (2006.01) |
| | *C25B 9/18* | (2006.01) |
| | *H01M 8/2425* | (2016.01) |

(52) U.S. Cl.
CPC ............ *C25B 9/08* (2013.01); *C25B 9/18* (2013.01); *H01M 8/2425* (2013.01); *Y02E 60/366* (2013.01)

(56) References Cited

U.S. PATENT DOCUMENTS

| | | |
|---|---|---|
| 2009/0289227 A1 | 11/2009 | Rising |
| 2013/0032490 A1 | 2/2013 | Le Gallo et al. |
| 2016/0355932 A1* | 12/2016 | Reytier ............... C25B 15/02 |

OTHER PUBLICATIONS

May 9, 2014 International Search Report in PCT/IB2013/060936.
Laurencin et al., Modelling of solid oxide steam electrolyser: Impact of the operating conditions on hydrogen production, "Journal of Power Sources", vol. 196, 2011, pp. 2080-2093.

* cited by examiner

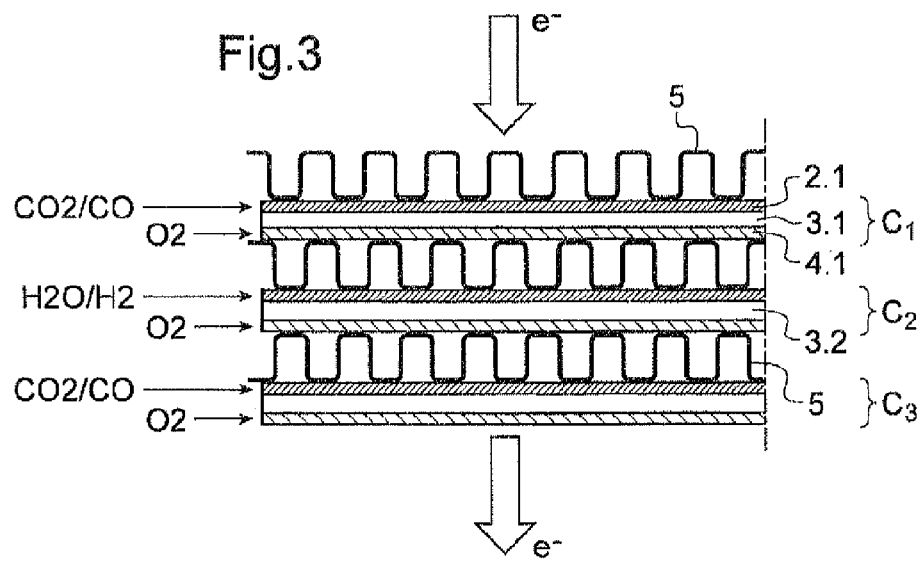
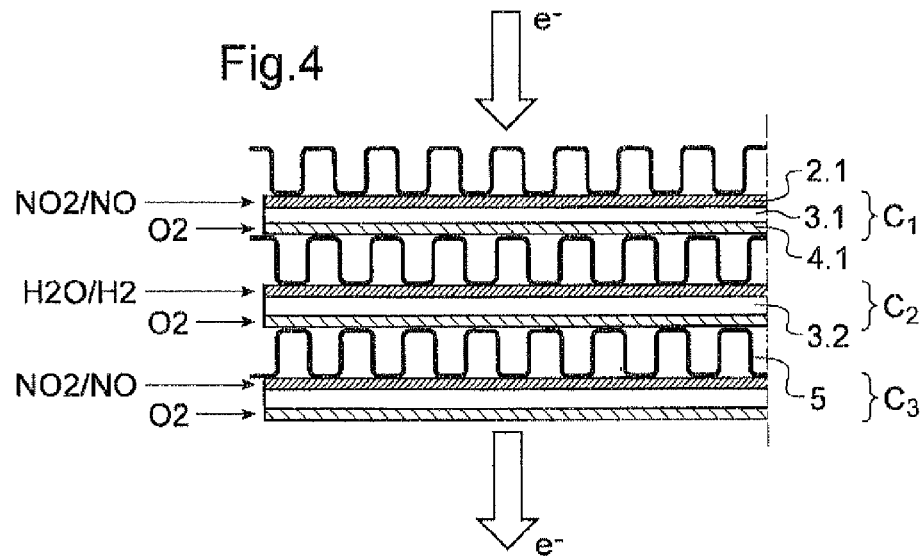

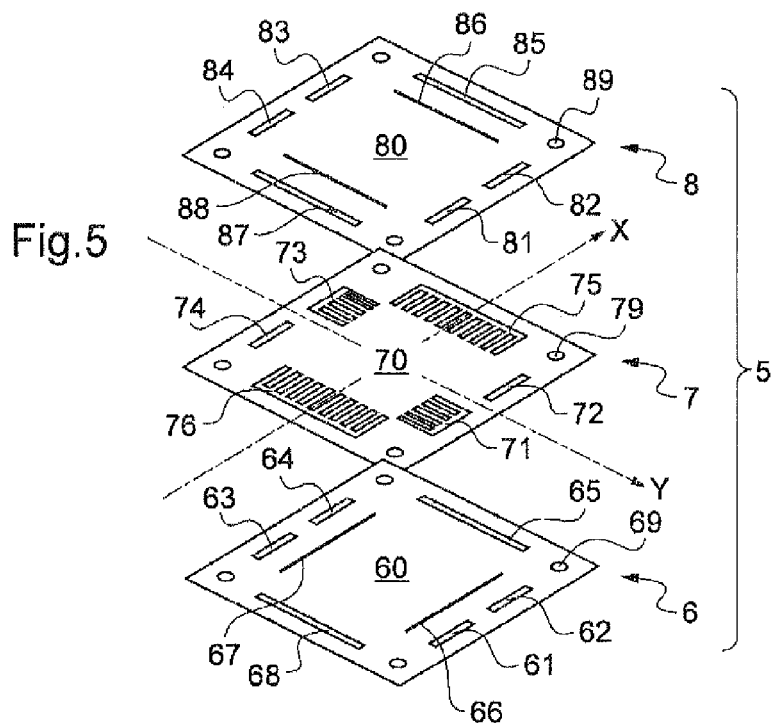
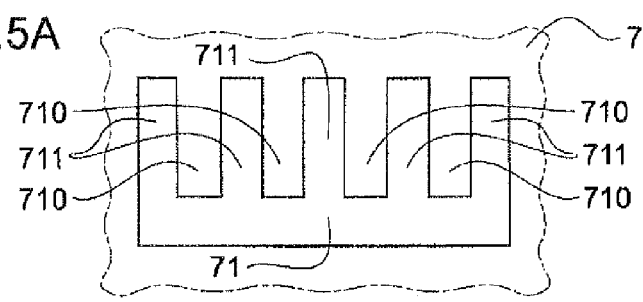
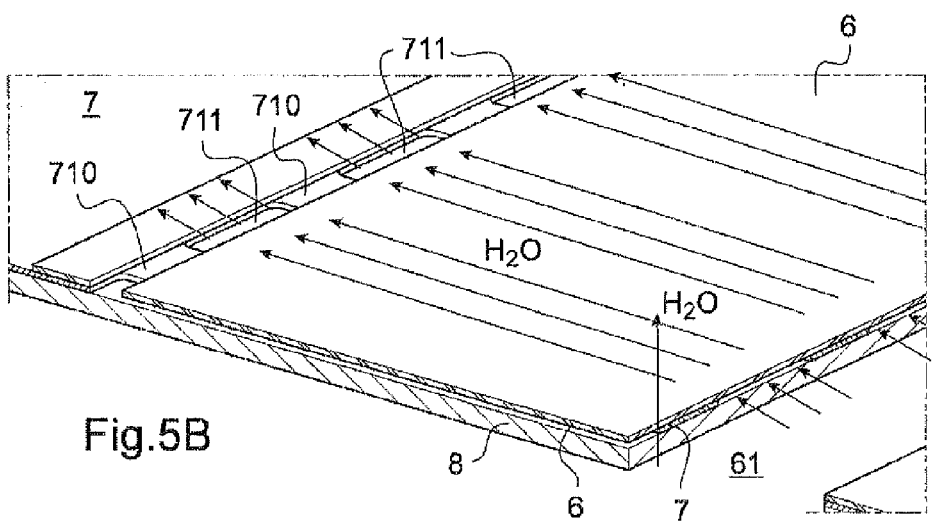

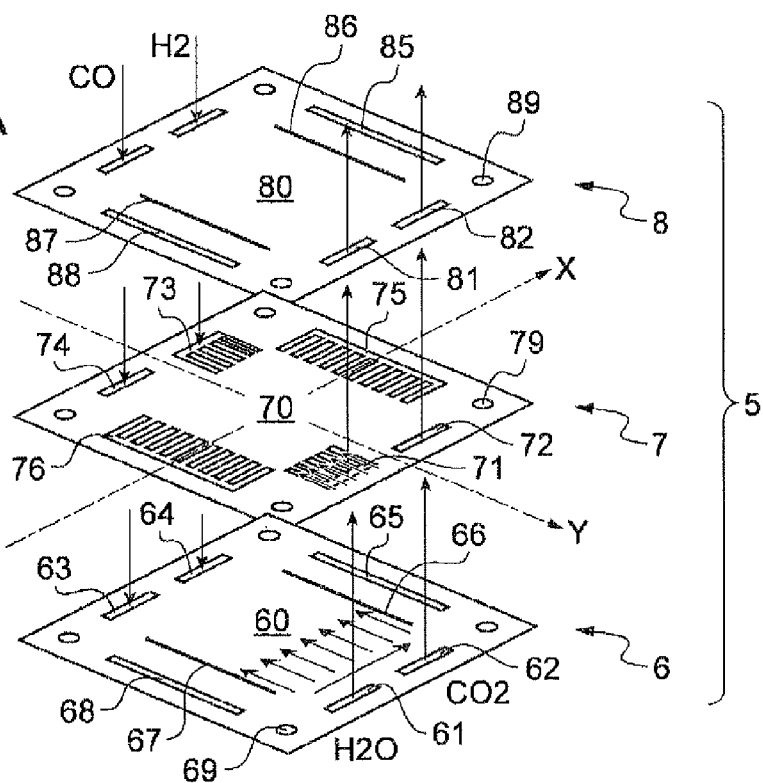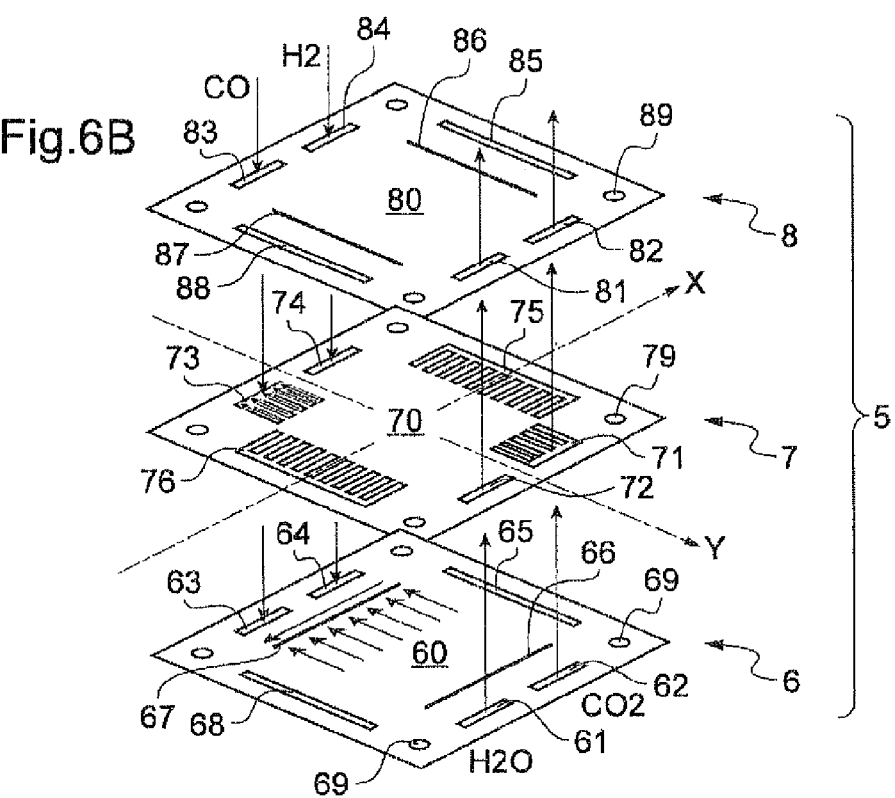

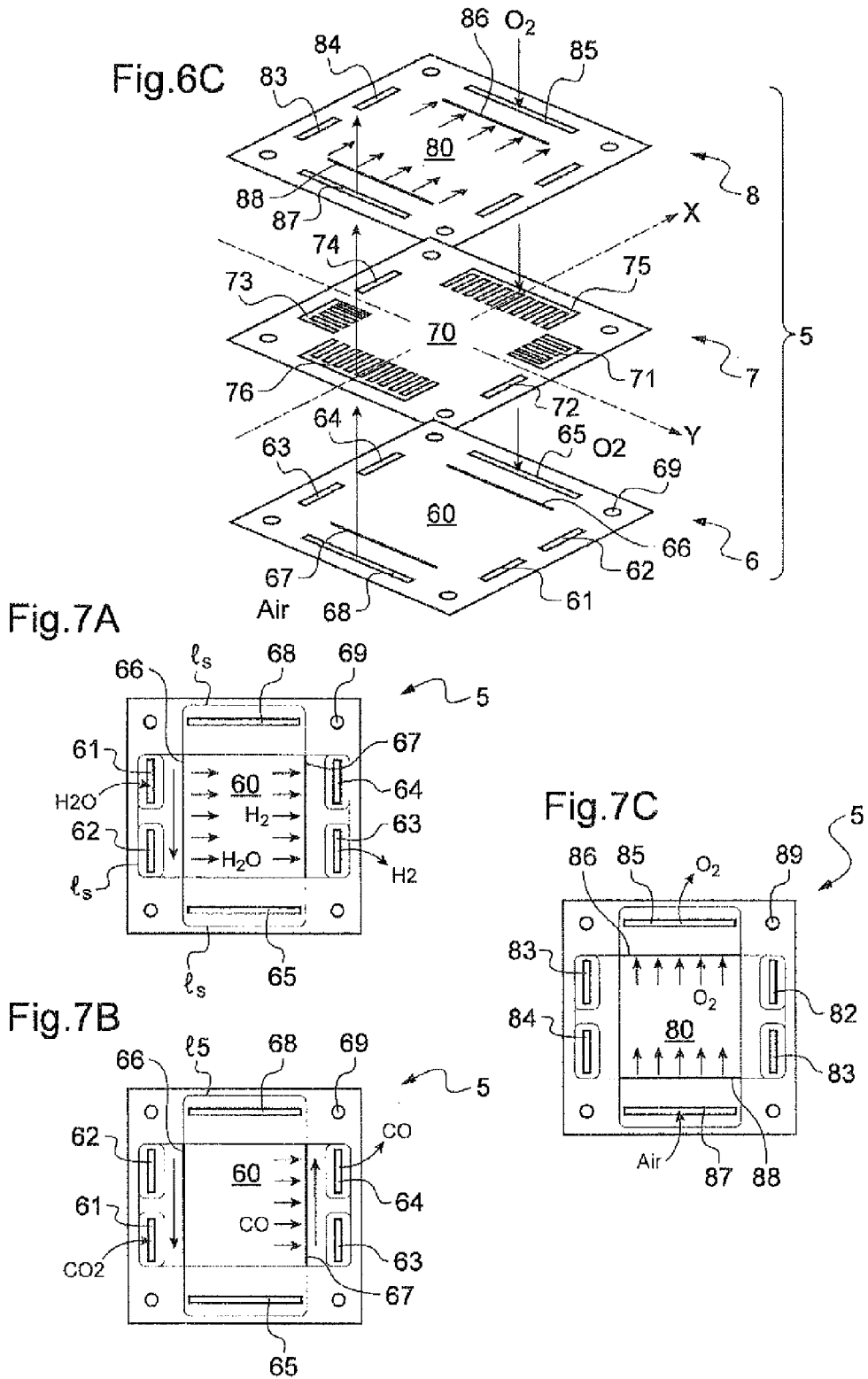

METHOD FOR HIGH-TEMPERATURE ELECTROLYSIS OF STEAM AND ANOTHER GAS, RELATED INTERCONNECTOR, ELECTROLYSIS REACTOR AND OPERATING METHODS

FIELD OF TECHNOLOGY

The present invention relates to the field of high-temperature electrolysis of water (HTE, High-Temperature Electrolysis, or HTSE, High-Temperature Steam Electrolysis) and electrolysis of another gas selected from carbon dioxide $CO_2$ or nitrogen dioxide $NO_2$.

The invention relates more particularly to a novel implementation of an electrical and fluidic interconnector in a high-temperature electrolysis (HTE) reactor, with a stack of elementary electrolysis cells for producing a synthesis gas ("syngas" for $H_2+CO$ mixture) starting from steam $H_2O$ and carbon dioxide $CO_2$, with a view to performing either a synthesis according to the Fischer-Tropsch process followed by hydrocracking to produce liquid fuel of the diesel or kerosene type, or synthesis of methane, or synthesis of methanol, or synthesis of dimethyl ether (DME).

This novel implementation of an interconnector also allows production of a synthesis gas starting from steam $H_2O$ and nitrogen dioxide $NO_2$, with a view to performing synthesis of ammonia $NH_3$.

It is to be noted here that the interconnecting devices, electrical and fluidic, also called interconnectors or interconnecting plates, are the devices that provide series connection, from an electrical standpoint, of each electrolysis cell in the stack of HTE reactors, and in parallel from a fluidic standpoint, thus combining the output of each of the cells. The interconnectors thus provide the functions of current feed-in and collection and delimit compartments for circulation (distribution and/or collection) of the gases.

PRIOR ART

Among the solutions for mass energy storage already envisaged, hydraulic storage is already used very widely. There is a risk that the remaining capacities for this type of storage may soon be saturated. Moreover, hydraulic installations require particular geographic and geological conditions and may therefore prove quite expensive. For future storage problems, hydraulic storage can therefore only be a partial solution.

An alternative storage solution has also been envisaged: this is compressed air storage (CAES, Compressed Air Energy Storage). According to this technology, compressed air produced with electricity is to be stored in underground cavities. The latter also require specific geographic characteristics, such as salt cavities. However, this storage solution is not of satisfactory efficiency.

Finally, hydrogen is touted as an energy carrier that may be suitable for mass storage of electricity in certain configurations: we may mention the project already implemented in Corsica with the acronym MYRTE (acronym of Mission hYdrogène Renouvelable pour l'Intégration au Réseau Electrique: Renewable Hydrogen Mission for Integration with the Electric Grid) on the applicant's initiative.

However, all these solutions for mass energy storage require extensive infrastructures to be developed (sites suitable for hydraulic storage, underground cavities, systems for hydrogen storage). That is why, more recently, mass energy storage by converting renewable electricity to chemical energy via the production of synthetic fuel has made a significant breakthrough, representing a storage alternative with great potential. We may mention patent application US 2009/0289227, which mentions technical solutions for conversion.

Moreover, reduction of emissions of carbon dioxide $CO_2$ resulting from the use of fossil energy sources, upgrading the $CO_2$ resulting from the use of these energy sources as much as possible rather than storing it for an indeterminate length of time, using on demand the electricity obtained from so-called decarbonized energy sources, notably during periods of overproduction, transforming this electricity into a storable product optionally allowing electricity to be produced on demand during periods of production shortfalls without having to employ energy sources with a high carbon content, are further objectives to be achieved for the sake of global efficiency.

The manufacture of a synthesis gas, a mixture of variable amounts of carbon monoxide CO and hydrogen $H_2$, starting from a mixture of steam and carbon dioxide $CO_2$ from so-called decarbonized electricity meets these objectives. In fact, said manufacture of synthesis gas makes it possible to envisage the production of hydrocarbons and notably of methane, the main constituent of natural gas. The production of synthetic natural gas offers the possibility of immediately using all the existing infrastructures developed for this form of energy: transport and distribution networks, storage capacities, electricity generating installations, etc. Moreover, it also emerges that the carbon balance of this production might be zero, or even negative, since the electricity used would be of decarbonized origin and the $CO_2$ would be obtained from installations using fossil energy sources.

There are currently three main technological routes for obtaining a synthesis gas that is intended to serve as fuel.

The first route consists of injecting a mixture of hydrogen $H_2$ and carbon dioxide $CO_2$ in a catalyst. Production of a synthesis gas ($H_2+CO$) may then take place via a first step of manufacture of hydrogen, for example by electrolysis of water (I), followed by a reverse water gas reaction (RWGS, Reverse Water Gas Synthesis) (II) according to the equations:

$$\text{Electrolysis of water: } H_2O \rightarrow H_2 + \tfrac{1}{2}O_2 \quad (I)$$

$$\text{Reverse water gas reaction: } H_2 + CO_2 \rightarrow CO + H_2O \quad (II)$$

The second route consists of producing synthesis gas by electrolysis of carbon dioxide $CO_2$ (III) and by independent electrolysis of water $H_2O$ (I) according to the following equations and then mixing the products obtained:

$$\text{Electrolysis of water: } H_2O \rightarrow H_2 + \tfrac{1}{2}O_2 \quad (I)$$

$$\text{Electrolysis of } CO_2: CO_2 \rightarrow CO + \tfrac{1}{2}O_2 \quad (III)$$

The third route finally consists of producing this synthesis gas in one step by a reaction called co-electrolysis of water and $CO_2$ according to the following equation:

$$\text{Co-electrolysis: } CO_2 + H_2O \rightarrow CO + H_2 + O_2 \quad (IV).$$

For carrying out electrolysis of water (I), it is advantageous to carry this out at high temperature typically between 600 and 950° C., as some of the energy required for the reaction can be supplied by heat, which is cheaper than electricity, and activation of the reaction is more efficient at high temperature and does not require a catalyst. A known method for carrying out high-temperature electrolysis is to use an electrolyzer of the SOEC (Solid Oxide Electrolyte Cell) type, consisting of a stack of elementary units each comprising a solid-oxide electrolysis cell, consisting of three layers anode/electrolyte/cathode superposed on one another, and metal alloy interconnecting plates, also called bipolar plates, or interconnectors. The function of the interconnectors is to provide both the passage of electric current and circulation of the gases in the vicinity of each cell (steam injected, hydrogen and oxygen extracted in an HTE electrolyzer; air and hydrogen injected and water extracted in an SOFC stack) and separate the anode and cathode compartments, which are the compartments for circulation of the gases for the anodes and cathodes of the cells, respectively. For carrying out high-temperature electrolysis of steam HTE, steam $H_2O$ is injected into the cathode compartment. Under the action of the current applied to the cell, dissociation of the water molecules in the form of steam takes place at the interface between the hydrogen electrode (cathode) and the electrolyte: this dissociation produces dihydrogen gas $H_2$ and oxygen ions. The dihydrogen is collected and evacuated at the outlet of the hydrogen compartment. The oxygen ions $O^{2-}$ migrate through the electrolyte and recombine into dioxygen at the interface between the electrolyte and the oxygen electrode (anode).

Each of the existing three technological routes for obtaining a synthesis gas, detailed above, has its particular drawbacks and advantages which may be detailed as follows.

Independent electrolysis of the two gases according to the second route offers the major advantage of great flexibility in management of the $H_2$/CO mixture. However, the major drawbacks of this second route are the need for capital investment in two separate electrolyzers (electrolysis reactors) and the lack of significant thermal coupling between the two reactions (I) and (III).

The first route gives better thermal coupling when high-temperature steam electrolysis (I) is carried out, which releases heat in exothermic mode, which can be utilized efficiently by the reverse water gas reaction (II), which is endothermic. Having said this, the RWGS reaction supports very little water at inlet, which necessitates condensing the water between reactions (I) and (II) and increases the cost of this process considerably.

Finally, co-electrolysis of steam and $CO_2$ (IV) according to the third route offers potentially the same energy and economic advantages as those described above for the first route (reactions (I) and (II)) without the drawback of having to perform an intermediate condensation. Its benefits reside in the possibility of carrying out the reaction of co-electrolysis (IV) in one and the same electrolysis reactor, maintaining the latter in a temperature range close to 800° C. In fact, at this temperature, the voltages required for reduction of $CO_2$ to CO and $H_2O$ to $H_2$ are almost identical. As an example, the open-circuit voltages, i.e. the voltages obtained without electric current but only owing to the different gases on either side of a cell, for a mixture of 90% of oxidized species and 10% of reduced species at 800° C. are respectively equal to 0.852V for the pairs $H_2O$, $H_2/O_2$ and 0.844V for the pairs $CO_2$, $CO/O_2$.

Moreover, high-temperature co-electrolysis offers the same energy advantage as steam electrolysis between 750 and 900° C. relative to low-temperature water electrolysis. In fact, the energy required for dissociation of the $H_2O$ molecules is reduced by the energy of evaporation. Moreover, the kinetics of the reactions of electrolysis of $H_2O$ and of $CO_2$ are highly thermally activated and follow an Arrhenius law with activation energies of the order of 120 kJ/mol. Consequently, the efficiency of the reactions improves considerably when the temperature is increased. Moreover, the increased electrochemical activity at high temperature means we no longer require an expensive catalyst, such as platinum, which is required at lower temperatures. Moreover, the production of synthesis gas in the cathode compartment of the co-electrolysis reactor is accompanied by production of oxygen in the anode compartment, which can be utilized subsequently, for example for oxycombustion of natural gas.

This being so, if high-temperature co-electrolysis (IV) as envisaged offers the aforementioned advantages, namely investment in a single electrolysis reactor, and thermal coupling between the various reactions, it has the drawback that it does not allow a variable $H_2$/CO ratio to be obtained in the mixing gas at reactor outlet. In other words, when co-electrolysis is carried out, a desired $H_2$/CO ratio at outlet imposes a given $H_2O/CO_2$ ratio at inlet. In fact, operation near the thermo-neutral operating point fixes the voltage to be applied to the electrolyzer. Thus, for a desired $H_2$/CO ratio at outlet with a degree of water conversion close to 100%, the inlet flow rates and compositions of $CO_2$ and $H_2O$ must necessarily be determined.

Now, every synthesis gas intended to produce a fuel requires a given $H_2$/CO ratio as a function of the target fuel. Table 1 below illustrates the ratios required in relation to the processes for synthesis of different fuels:

TABLE 1

| SYNTHESIS PROCESS | COMBUSTIBLE PRODUCT OBTAINED | REQUIRED $H_2$/CO RATIO |
|---|---|---|
| methane synthesis | Natural gas | 1/3 |
| methanol synthesis | Methanol | 1/2 |
| synthesis of dimethyl ether (DME) | DME | 1/1 |
| Fischer-Tropsch synthesis | Diesel | 1/2 |

Moreover, the operating point adopted also fixes the thermal conditions in the electrolysis reactor. In fact, for electrolysis processes carried out at high temperature, the energy ΔH required for dissociation of the molecule at inlet ($H_2O$ or $CO_2$) may be supplied in electrical form and/or as heat. The thermal energy supplied Q is then defined as a function of the voltage U at the terminals of each electrolysis cell by the relation:

$$Q = \frac{I}{2F}\Delta H - U \cdot I,$$

in which U is voltage, I is electric current and F is Faraday's constant. Thus, three operating regimes are defined, corresponding to three different thermal modes for the stack of electrolysis cells:

the so-called autothermal mode in which the voltage imposed Uimp is equal to ΔH/2F. The heat consumed by the dissociation reaction is completely compensated by the various electrical resistances of the electrolyzer (irreversibilities). The electrolysis reactor (electrolyzer) does not need special thermal management, while remaining stable at temperature.

the so-called endothermic mode in which the voltage imposed Uimp is lower than ΔH/2F. The electrolyzer consumes more heat than the electrical losses within it. This required heat must then be supplied to it by another means, otherwise its temperature will drop irretrievably.

the so-called exothermic mode in which the voltage imposed Uimp is greater than ΔH/2F. Electrolysis then consumes less heat than the electrical losses by the Joule effect. This release of heat within the electrolyzer must then be removed by another means, otherwise its temperature will rise prohibitively.

The endothermic mode requires a lower consumption of electricity: there is therefore little output and it is necessary to supply heat to the electrolysis reactor. The benefit of this endothermic mode resides in the availability of an inexpensive source of heat. Everything then depends on the nature and temperature of this heat source.

Conversely, the exothermic mode requires a higher consumption of electricity: there is therefore considerable output, but it is necessary to cool the electrolysis reactor, which may be very expensive. The benefit of this exothermic mode then depends greatly on the cost of the electricity and the utilization of the surplus heat.

There is a need to find a new technological route for producing a synthesis gas intended to serve as fuel, notably eliminating the drawbacks of the three aforementioned existing routes, while keeping their advantages.

One aim of the invention is to meet this need, at least partly.

Another aim of the invention is to propose a process and a reactor for production of a synthesis gas, to achieve the aforementioned aim and obtain a variable $H_2/CO$ ratio.

DISCLOSURE OF THE INVENTION

For this purpose, according to one of its aspects, the invention relates to a process for high-temperature electrolysis of steam $H_2O$ and of another gas to be electrolyzed selected from carbon dioxide $CO_2$ and nitrogen dioxide $NO_2$, carried out in an electrolysis reactor comprising a stack of elementary electrolysis cells of the SOEC type each formed from a cathode, an anode and an electrolyte interposed between the cathode and the anode, and a plurality of electrical and fluidic interconnectors each arranged between two adjacent elementary cells with one of its faces in electrical contact with the anode of one of the two elementary cells and the other of its faces in electrical contact with the cathode of the other of the two elementary cells, according to which steam is supplied and distributed to the cathode of one of the two adjacent elementary cells and either carbon dioxide or nitrogen dioxide is supplied and distributed to the cathode of the other of the two elementary cells.

In other words, the process according to the invention consists essentially of carrying out simultaneous co-electrolysis of water and of another gas selected from $CO_2$ or $NO_2$, not as in the prior art by mixing them beforehand, but separately so as to perform one type of electrolysis per cell.

In other words, moreover, in the process according to the invention, the steam and the $CO_2$ or $NO_2$ flow independently of one another on two adjacent cells, whereas the gases $O_2$ produced by the two electrolysis processes are recovered jointly.

According to an advantageous embodiment of the invention, an operating regime in exothermic mode is defined for steam electrolysis at the cathode of one of the two adjacent elementary cells and simultaneously an operating regime in endothermic mode is established for electrolysis of carbon dioxide or nitrogen dioxide at the cathode of the other of the two adjacent elementary cells, the heat released by steam electrolysis being able to supply, at least partly, the heat required by the electrolysis of carbon dioxide or of nitrogen dioxide.

Alternatively, according to an advantageous embodiment, an operating regime in exothermic mode is defined for electrolysis of carbon dioxide or nitrogen dioxide at the cathode at the cathode of one of the two adjacent elementary cells and simultaneously an operating regime in endothermic mode is established for steam electrolysis of the other of the two adjacent elementary cells, the heat released by the electrolysis of carbon dioxide or nitrogen dioxide being able to supply, at least partly, the heat required by the steam electrolysis.

Thus, the process according to the invention offers the best possible management of the thermal conditions of the reaction of electrolysis of steam $H_2O$ by the thermal effect of the reaction of electrolysis of the other gas selected from $CO_2$ or $NO_2$, while obtaining an $H_2/CO$ ratio at outlet that can be adjusted as desired.

According to another of its aspects, the invention also relates to a device forming an electrical and fluidic interconnector for high-temperature electrolysis of steam and another gas to be electrolyzed selected from carbon dioxide $CO_2$ and nitrogen dioxide $NO_2$, said device consisting of three flat sheets, elongated along two axes of symmetry (X, Y) orthogonal to one another, one of the end sheets being intended to come into mechanical contact with the plane of a cathode of an elementary electrolysis cell and the other of the end sheets being intended to come into mechanical contact with the plane of an anode of an adjacent elementary electrolysis cell, each of the two adjacent elementary electrolysis cells of the SOEC type being formed from a cathode, an anode, and an electrolyte interposed between the cathode and the anode, and in said device each of the three flat sheets comprises an unperforated central part, which is perforated, at the periphery of its central part, by at least five openings, the first to fourth openings of each sheet being elongated over a length corresponding to a part of the length of the central part along one of the X axes of the sheets and being distributed two by two on either side of said X axis, whereas the fifth opening is elongated over a length roughly corresponding to the length of the central part along the other of the Y axes, one of the end sheets, called first end sheet, further comprises a sixth and seventh openings arranged symmetrically on either side of the X axis, within its first to fourth openings, and are elongated over a length roughly corresponding to the length of the central part along the X axis, whereas the other of the end sheets, called second end sheet, further comprises a sixth opening within its fifth opening, and is elongated over a length roughly corresponding to the length of the central part along said Y axis, and, the first, third, and fifth openings of the central sheet are broadened respectively relative to the first, third and fifth openings of each end sheet, whereas the second and fourth opening of the three sheets are of dimensions roughly identical to one another, all the broadened openings of the central sheet comprise, in their broadened part, tongues of sheets spaced apart, forming a comb, each of the slits defined between the edge of a broadened slit and a tongue or between two consecutive tongues opening onto one of the interior openings of the first or second end sheet, the three sheets are stratified and assembled together so that:

the tongues of sheets form spacer frames between the first and second end sheets respectively between the first and sixth openings of the first sheet, between the third and seventh openings of the first end sheet, and between the fifth and sixth openings of the second end sheet, each of the first to fifth openings of one of the three sheets is in fluid communication individually respectively with one of the corresponding first to fifth openings of the other two sheets, the first or alternatively the second opening of the first end sheet is in fluid communication with the sixth opening of the first end sheet via the slits of the first broadened opening of the central sheet, the third or alternatively the fourth opening of the first end sheet is in fluid communication with the seventh opening of the first end sheet via the slits of the third broadened opening of the central sheet, the fifth and sixth openings of the second end sheet are in fluid communication via the slits of the fifth broadened opening of the central sheet.

According to an advantageous embodiment, when we wish to evacuate the oxygen produced by the two types of electrolysis reactions, the interconnector is such that:

the first end sheet further comprises an eighth opening elongated over a length roughly corresponding to the length of the central part along the other of the Y axes and arranged opposite its fifth opening relative to the Y axis, the second end sheet further comprises a seventh opening elongated over a length roughly corresponding to the length of the central part along the other of the Y axes and arranged opposite its fifth opening relative to the Y axis, and an eighth opening elongated over a length roughly corresponding to the length of the central part along said Y axis, and arranged opposite its sixth opening relative to the Y axis, the central sheet further comprises a sixth opening broadened relative to the eighth of the first end sheet and to the seventh opening of the second end sheet, the three sheets are assembled together in such a way that the seventh and eighth openings elongated along the Y axis of the second end sheet are in fluid communication via the sixth opening of the central sheet.

Preferably, the three sheets are assembled together by welding or brazing, more preferably by weld lines (ls) closed individually around each fluid communication.

Preferably, the three sheets are of ferritic steel with about 20% chromium, preferably of CROFER® 22APU or FT18TNb, nickel-based of the Inconel® 600 or Haynes® type. Each of the three sheets preferably has a thickness between 0.1 and 1 mm.

According to an advantageous embodiment, the three sheets are perforated at their periphery with additional openings suitable for housing fixing tie rods.

According to another aspect, the invention also relates to an electrolysis reactor comprising a stack of elementary electrolysis cells of the SOEC type each formed from a cathode, an anode and an electrolyte interposed between the cathode and the anode, and a plurality of electrical and fluidic interconnectors as described above, each arranged between two adjacent elementary cells with the first end sheet in electrical contact with the cathode of one of the two elementary cells and the second end sheet in electrical contact with the anode of the other of the two elementary cells, in which, in one of two adjacent interconnectors, fluid communication is provided between on the one hand the first and sixth openings of the first end sheet and on the other hand the third and seventh openings of the first end sheet, whereas in the other of the two adjacent interconnectors, fluid communication is provided between on the one hand the second and sixth openings of the first end sheet and on the other hand the fourth and seventh openings of the first end sheet. According to an advantageous embodiment the electrical resistance of one of the two adjacent elementary cells is different from the electrical resistance of the other of the two adjacent elementary cells. Thus, the thermal conditions of one of the two reactions of electrolysis, for example that of the steam, can be managed by the other of the two reactions of electrolysis, for example that of the carbon dioxide, and vice versa.

According to this embodiment, a preferred variant consists in that the active surface area of at least one electrode of one of the two adjacent elementary cells is different from the active surface area of at least one electrode of the other of the adjacent elementary cells. Thus, preferably, the elementary electrolysis cells are of the cathode-supported type, and the active surface area of the anode of one of the two adjacent elementary cells is different from the active surface area of the anode of the other of the two adjacent elementary cells.

In yet another of its aspects, the invention finally relates to a method of operation of an electrolysis reactor that has just been described, according to which:

the first openings are supplied with steam and simultaneously the second openings are supplied with another gas to be electrolyzed selected from carbon dioxide $CO_2$ and nitrogen dioxide $NO_2$, the hydrogen produced by steam electrolysis is recovered in the openings and simultaneously the carbon monoxide or nitrogen monoxide produced by the electrolysis of the other gas is recovered in the fourth openings and simultaneously the oxygen produced both by electrolysis of steam and of the other gas is recovered in the fifth openings.

The invention also relates to a method of operation of an electrolysis reactor as described above, according to which:

the second openings are supplied with steam and simultaneously the first openings are supplied with another gas to be electrolyzed selected from carbon dioxide $CO_2$ and nitrogen dioxide $NO_2$, the hydrogen produced by steam electrolysis is recovered in the fourth openings and simultaneously the carbon monoxide or nitrogen monoxide produced by the electrolysis of the other gas is recovered in the third openings and simultaneously the oxygen produced both by electrolysis of steam and of the other gas is recovered in the fifth openings.

According to an advantageous embodiment, the hydrogen produced and recovered in the third or alternatively the fourth openings is mixed at the outlet of the electrolysis reactor with the carbon monoxide produced and recovered in the fourth or alternatively the third openings, to produce a synthesis gas with a view to performing either a synthesis according to the Fischer-Tropsch process followed by hydrocracking to produce liquid fuel of the diesel or kerosene type, or synthesis of methane, or synthesis of methanol, or synthesis of dimethyl ether (DME).

According to another advantageous embodiment, the hydrogen produced and recovered in the third or alternatively the fourth openings is mixed at the outlet of the electrolysis reactor with the nitrogen monoxide produced and recovered in the fourth or alternatively the third openings, to produce a gas with a view to performing synthesis of ammonia $NH_3$.

The invention also relates to a method of operation of an electrolysis reactor that has just been described, according to which:

only the first or alternatively the openings are supplied with steam, the hydrogen produced by steam electrolysis is recovered in the third or alternatively the fourth openings and simultaneously the oxygen produced by steam electrolysis is recovered in the fifth openings.

The invention also relates to a method of operation of an electrolysis reactor that has just been described, according to which:

only the first or alternatively the second openings are supplied with another gas to be electrolyzed selected from carbon dioxide $CO_2$ and nitrogen dioxide $NO_2$, carbon monoxide or nitrogen monoxide produced by the electrolysis of the other gas is recovered in the third or alternatively the fourth openings and simultaneously the oxygen produced by the electrolysis of the other gas is recovered in the fifth openings.

When we wish to recover the oxygen produced by a draining gas, in addition the eighth opening of the first end sheet, the sixth opening of the central sheet and the seventh opening of the second end sheet are supplied with a draining gas, such as air.

Here, and in the context of the invention, "opening" means a hole that opens on either side of a metal sheet.

In other words, the process according to the invention consists of electrolyzing steam $H_2O$ and carbon dioxide $CO_2$ or nitrogen dioxide $NO_2$ separately but within one and the same electrolysis reactor with a stack of cells of the SOEC type. The process according to the invention is implemented advantageously by means of the interconnector according to the invention.

The invention makes it possible to preserve the advantages accruing to the existing three main technological routes for producing a synthesis gas intended to serve as fuel while limiting their drawbacks.

The invention makes it possible to vary at will the $H_2/CO$ ratio obtained at outlet before mixing to constitute the synthesis gas, and to facilitate thermal management of the stack of electrolysis cells whatever the manner of operation (endothermic or exothermic mode), reversibly, depending on the cost of the current.

Separate electrolysis of steam and carbon dioxide in one and the same electrolysis reactor, according to the invention, offers many advantages. Among these advantages, we may mention:

flexibility of the $H_2/CO$ ratio obtained, at electrolysis reactor outlet, regardless of the operating mode (exothermic or endothermic), possibility of carrying out the two high-temperature electrolysis processes in an electrolysis reactor of the SOEC, for greater efficiency, use of a single stack, which limits the capital expenditure, flexibility of the manner of operation in endothermic mode and in exothermic mode, thermal coupling between the two electrolysis processes, making thermal management of the stack of electrolysis cells less expensive, possibility of using an electrolysis reactor comprising interconnectors according to the invention solely for electrolysis of steam or solely for electrolysis of carbon dioxide $CO_2$ or nitrogen dioxide $NO_2$.

Here, and in the context of the invention, "cathode-supported cell" means the definition already given in the field of high-temperature electrolysis HTE of water, denoted by the acronym CSC for "Cathode-supported Cell", i.e. a cell in which the electrolyte and the oxygen electrode (anode) are arranged on the hydrogen electrode or carbon monoxide electrode or nitrogen monoxide electrode (cathode), which is thicker and therefore serves for support.

DETAILED DESCRIPTION

Figure 2:
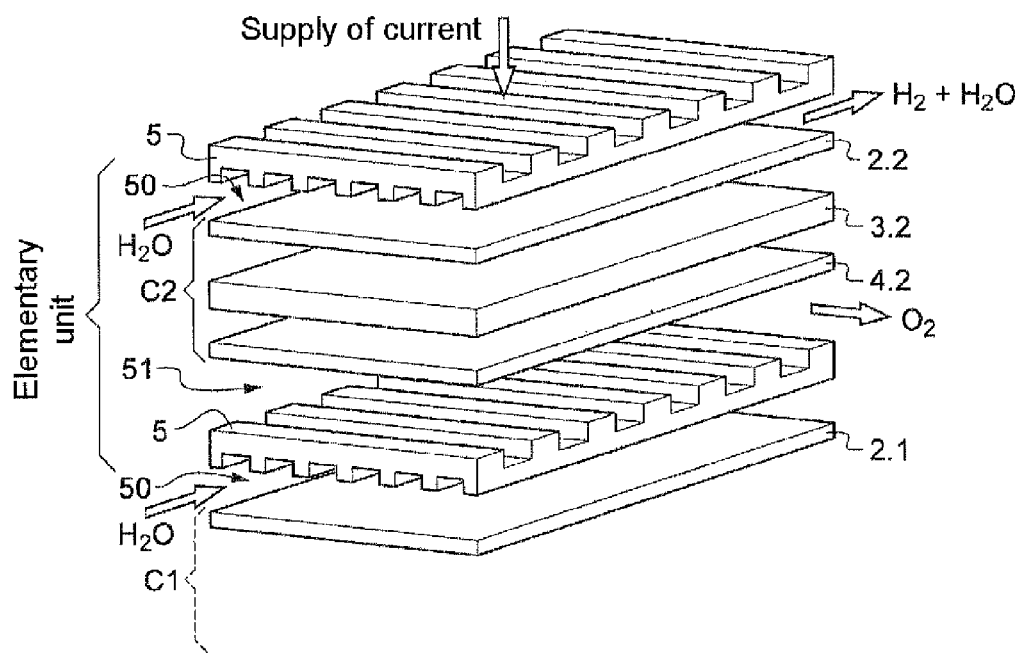
Figure 8:
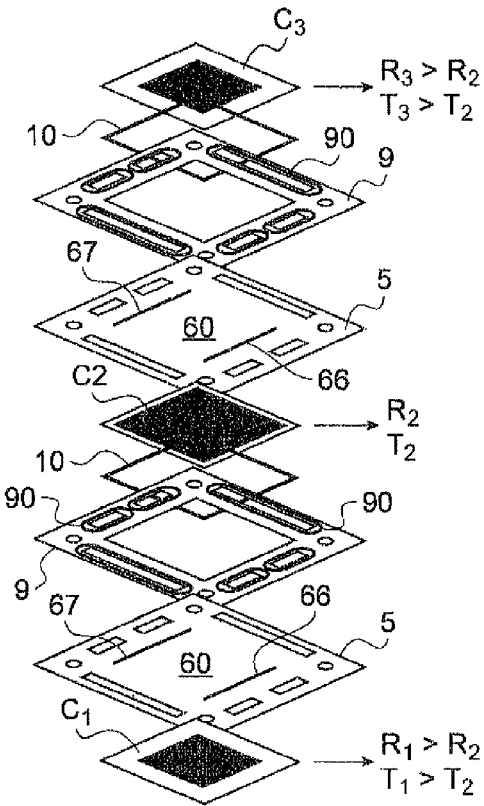
Figure 9:
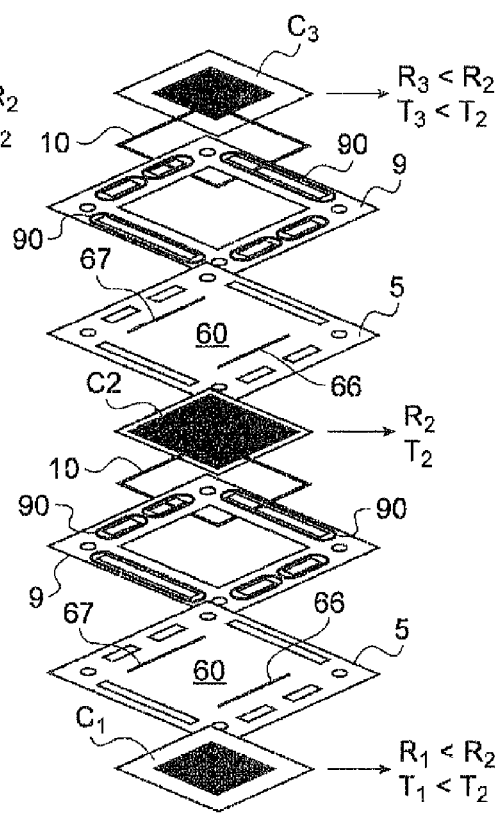
Figure 10A:
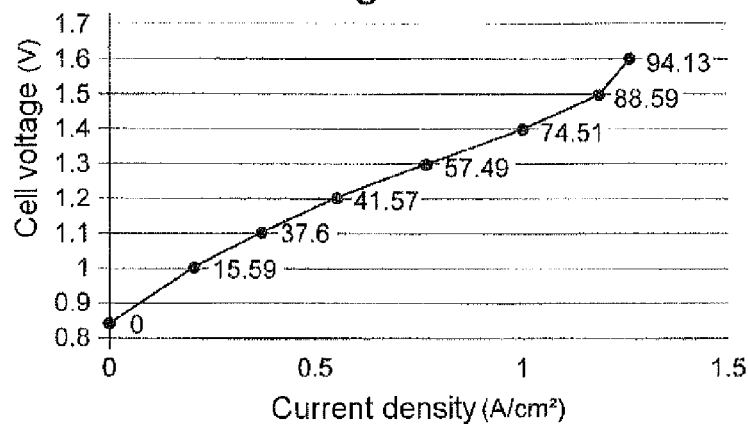
Figure 10B:
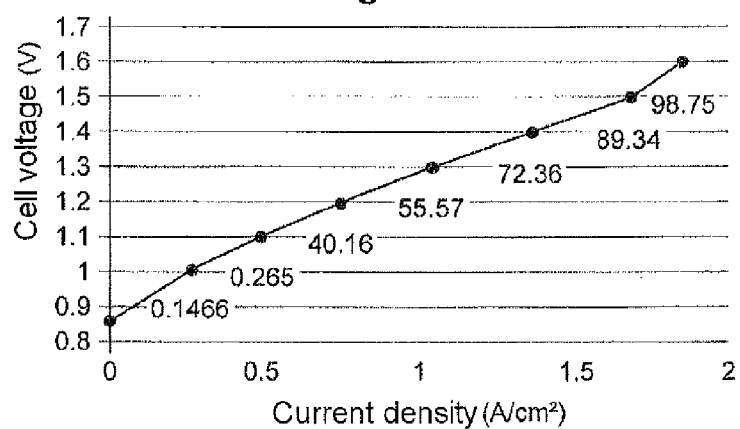
Figure 11:
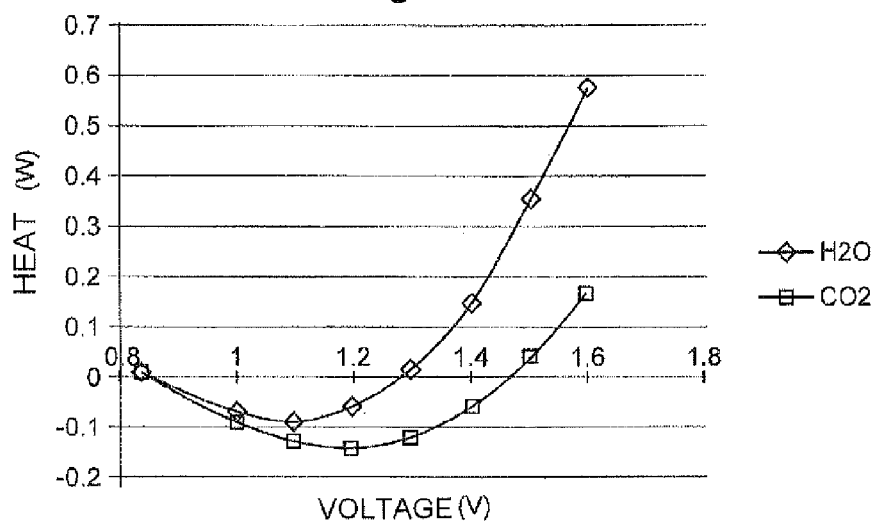
Figure 12A:
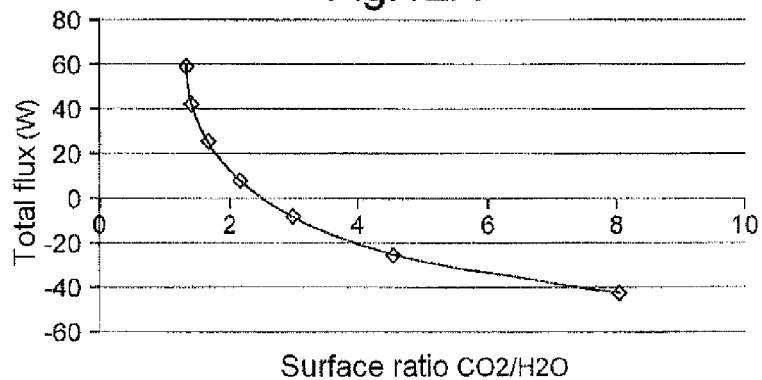
Figure 12B:
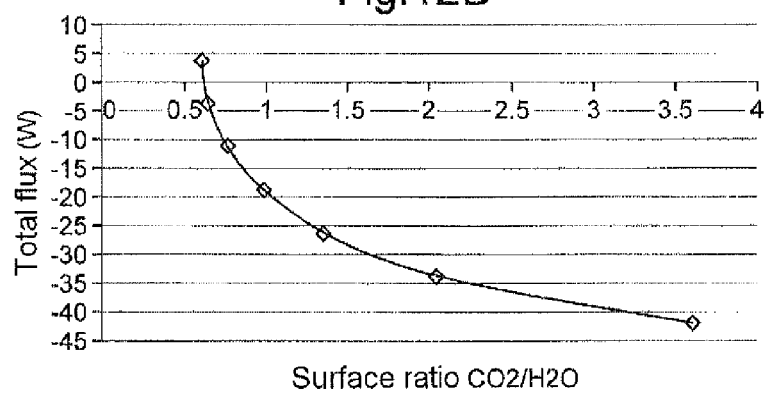
Figure 13:
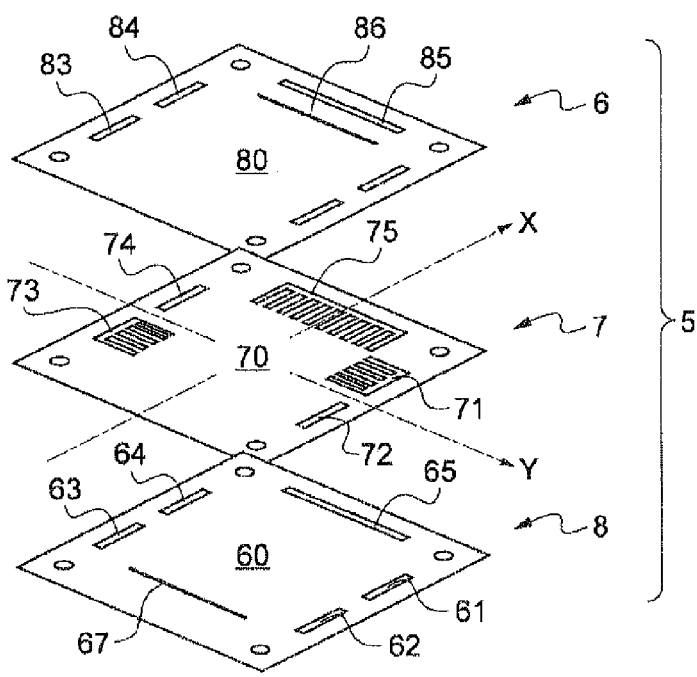

Other advantages and features of the invention will become clearer on reading the detailed description of examples of carrying out the invention, given purely for purposes of illustration, and nonlimiting, referring to the following figures, where:

FIG. 1 is a schematic view showing the principle of operation of a high-temperature water electrolyzer;

FIG. 2 is an exploded schematic view of a part of a high-temperature steam electrolyzer comprising interconnectors according to the prior art, FIG. 3 is a schematic sectional view of an electrolysis reactor using the process for simultaneous high-temperature electrolysis of steam $H_2O$ and carbon dioxide $CO_2$ according to the invention, FIG. 4 is a schematic sectional view of an electrolysis reactor using the process for simultaneous high-temperature electrolysis of steam $H_2O$ and nitrogen dioxide $NO_2$ according to the invention, FIG. 5 is an exploded view of an interconnector of an electrolysis reactor according to one embodiment of the invention, FIG. 5A is a detail view of FIG. 5, FIG. 5B is a perspective detail view of FIG. 5, FIG. 6A is an exploded view of an interconnector according to the invention intended to be in contact with the cathode of an elementary electrolysis cell of an electrolysis reactor, the figures showing respectively the supply, distribution and recovery of the steam and hydrogen produced, FIG. 6B is an exploded view of an interconnector according to the invention intended to be in contact with the cathode of an elementary electrolysis cell of an electrolysis reactor, the figures showing respectively the supply, distribution and recovery of the carbon dioxide and carbon monoxide produced, FIG. 6C is an exploded view of an interconnector according to the invention intended to be in contact with the anode of an elementary electrolysis cell of an electrolysis reactor, the figures showing respectively the supply, distribution and recovery of the air as draining gas and of the oxygen produced, FIGS. 7A to 7C are front views of an interconnector of an electrolysis reactor according to the invention showing respectively the path of the gases according to each of FIGS. 6A to 6C, FIGS. 8 and 9 are exploded views of a part of an electrolysis reactor according to the invention with interconnectors according to the invention and electrolysis cells with active surface area different from one cell to another adjacent cell, FIGS. 10A and 10B show curves representing the polarization (voltage change as a function of applied current) of a known cathode-supported electrolysis cell (CSC), at a temperature of 800° C., under carbon dioxide $CO_2$ at inlet and under steam $H_2O$ at inlet, respectively, FIG. 11 shows curves representing the heat flux generated as a function of the voltage applied to a known cathode-supported electrolysis cell (CSC), for a reaction of electrolysis of steam $H_2O$ and for a reaction of electrolysis of carbon dioxide $CO_2$, FIGS. 12A and 12B show curves representing the total heat flux generated as a function of the ratio of surface area between two known cathode-supported electrolysis cells (CSC), adjacent to one another according to FIG. 7, one of the cells employing a reaction of electrolysis of steam $H_2O$ and the other of the adjacent cells employing a reaction of electrolysis of carbon dioxide $CO_2$, FIG. 13 is an exploded view of an interconnector of an electrolysis reactor according to another embodiment of the invention.

It is to be noted here that in FIG. 12A, the cell for electrolysis of water $H_2O/H_2$ operates in exothermic mode at a voltage of 1.5V, whereas in FIG. 12B, this same cell operates in endothermic mode at a voltage of 1.2V.

It is also to be noted that in all of FIGS. 1 to 8, the symbols and the arrows for supply, on the one hand, of steam $H_2O$, for distribution and recovery of dihydrogen $H_2$ and of oxygen $O_2$, and of current, and on the other hand of carbon dioxide $CO_2$, for distribution and recovery of carbon monoxide CO and of oxygen $O_2$, and of current, are shown for purposes of clarity and accuracy, to illustrate the operation of a reactor for electrolysis of steam according to the prior art and of a reactor for simultaneous electrolysis of steam and carbon dioxide according to the invention.

It is also to be noted that all the electrolyzers described are of the type with solid oxides (SOEC, acronym of "Solid Oxide Electrolyte Cell") operating at high temperature. Thus, all the constituents (anode/electrolyte/cathode) of an electrolysis cell are ceramics. The high operating temperature of an electrolyzer (electrolysis reactor) is typically between 600° C. and 1000° C.

Typically, the characteristics of an elementary electrolysis cell SOEC suitable for the invention, of the cathode-supported type (CSC), may be those indicated as follows in Table 2 below.

TABLE 2

| Electrolysis cell | Unit | Value |
|---|---|---|
| Cathode 2 | | |
| Constituent material | | Ni-YSZ |
| Thickness | μm | 315 |
| Thermal conductivity | W m$^{-1}$ K$^{-1}$ | 13.1 |
| Electrical conductivity | Ω$^{-1}$ m$^{-1}$ | 10$^5$ |
| Porosity | | 0.37 |
| Permeability | m$^2$ | 10$^{-13}$ |
| Tortuosity | | 4 |
| Current density | A · m$^{-2}$ | 5300 |
| Anode 4 | | |
| Constituent material | | LSM |
| Thickness | μm | 20 |
| Thermal conductivity | W m$^{-1}$ K$^{-1}$ | 9.6 |
| Electrical conductivity | Ω$^{-1}$ m$^{-1}$ | 1 10$^4$ |
| Porosity | | 0.37 |
| Permeability | m$^2$ | 10$^{-13}$ |
| Tortuosity | | 4 |
| Current density | A · m$^{-2}$ | 2000 |
| Electrolyte 3 | | |
| Constituent material | | YSZ |
| Thickness | μm | |
| Resistivity | Ω m | 0.42 |

A water electrolyzer is an electrochemical device for production of hydrogen (and oxygen) under the action of an electric current.

In high-temperature electrolyzers HTE, the high-temperature electrolysis of water is performed starting from steam. The function of a high-temperature electrolyzer HTE is to convert steam to hydrogen and oxygen according to the following reaction:

$$2H_2O \rightarrow 2H_2 + O_2.$$

This reaction is carried out electrochemically in the cells of the electrolyzer. As shown schematically in FIG. 1, each elementary electrolysis cell 1 is formed from a cathode 2 and an anode 4, placed on either side of a solid electrolyte 3 generally in the form of a membrane. The two electrodes (cathode and anode) 2,4 are electron conductors, of porous material, and the electrolyte 3 is impervious to gas, an electronic insulator and an ionic conductor. The electrolyte may in particular be an anionic conductor, more precisely an anionic conductor of $O^{2-}$ ions, and the electrolyzer is then called an anionic electrolyzer.

The electrochemical reactions take place at the interface between each of the electron conductors and the ionic conductor.

At the cathode 2, the half-reaction is as follows:

$$2H_2O + 4e^- \rightarrow 2H_2 + 2O^{2-}.$$

At the anode 4, the half-reaction is as follows:

$$2O^{2-} \rightarrow O_2 + 4e^-.$$

The electrolyte 3 interposed between the two electrodes 2, 4 is the place of migration of the ions $O^{2-}$, under the effect of the electric field created by the potential difference imposed between the anode 4 and the cathode 2.

As illustrated in parentheses in FIG. 1, the steam at cathode inlet may be accompanied by hydrogen $H_2$ and the hydrogen produced and recovered at outlet may be accompanied by steam. Moreover, as illustrated with dotted lines, a draining gas, such as air, may in addition be injected at inlet to evacuate the oxygen produced. Injection of a draining gas has the additional function of performing the role of thermal regulator.

An elementary electrolysis reactor consists of an elementary cell as described above, with a cathode 2, an electrolyte 3, and an anode 4, and of two single-pole connectors that provide the functions of electrical, hydraulic and thermal distribution.

To increase the flow rates of hydrogen and oxygen produced, it is known to stack several elementary electrolysis cells on top of one another, separating them with interconnecting devices, usually called interconnectors or bipolar interconnecting plates. The assembly is positioned between two interconnecting end plates which support the electric feeds and gas feeds of the electrolyzer (electrolysis reactor).

A high-temperature water electrolyzer (HTE) thus comprises at least one, generally a plurality of electrolysis cells stacked on top of one another, each elementary cell being formed from an electrolyte, a cathode and an anode, the electrolyte being interposed between the anode and the cathode.

The fluidic and electrical interconnecting devices that are in electrical contact with one or more electrodes generally provide the functions of supplying and collecting electric current, and they delimit one or more compartments for circulation of the gases.

Thus, a so-called cathode compartment has the function of distribution of electric current and steam as well as recovery of hydrogen at the cathode in contact.

A so-called anode compartment has the function of distribution of electric current as well as recovery of the oxygen produced at the anode in contact, optionally using a draining gas.

Satisfactory operation of an HTE electrolyzer requires:
good electrical insulation between two adjacent interconnectors in the stack, to prevent short-circuiting of the elementary electrolysis cell interposed between the two interconnectors, good electrical contact and a sufficient contact surface area between each cell and interconnector, in order to obtain the lowest ohmic resistance between cell and interconnectors, good hermeticity between the two separate compartments, i.e. and cathodic, to prevent recombination of the gases produced, leading to a drop in efficiency and especially the development of hot spots, which damage the electrolyzer, good distribution of the gases both at inlet and recovery of the gases produced, otherwise there will be loss of efficiency, nonuniformity of pressure and of temperature in the various elementary cells or even prohibitive degradation of the cells.

FIG. 2 shows an exploded view of elementary units of a high-temperature steam electrolyzer according to the prior art. This HTE electrolyzer comprises a plurality of elementary electrolysis cells C1, C2 of the solid oxide type (SOEC) stacked alternately with interconnectors 5. Each cell C1, C2 . . . consists of a cathode 2.1, 2.2, . . . and an anode 4.1, 4.2, between which an electrolyte 3.1, 3.2 . . . is arranged.

The interconnector 5 is a metal alloy component that ensures separation between the cathode compartment 50 and anode compartment 51, defined by the volumes between the interconnector 5 and the adjacent anode 4.2 and between the interconnector 5 and the adjacent cathode 2.1 respectively. It also provides distribution of the gases to the cells. Injection of steam into each elementary unit takes place in the cathode compartment 50. Collecting of the hydrogen produced and of the residual steam at the cathode 2.1, 2.2 . . . takes place in the cathode compartment 51 downstream of the cell C1, C2 . . . after dissociation of the steam by the latter. Collecting of the oxygen produced at the anode 4.2 takes place in the anode compartment 51 downstream of the cell C1, C2 . . . after dissociation of the steam by the latter.

The interconnector 5 ensures passage of current between the cells C1 and C2 by direct contact with the adjacent electrodes, i.e. between the anode 4.2 and the cathode 2.1.

The present inventors decided to perform simultaneous high-temperature electrolysis of steam and another gas selected from carbon dioxide and nitrogen dioxide, in one and the same electrolysis reactor with a stack of cells, with supply and distribution of steam to the cathode of one of the two adjacent elementary cells and, separately, supply and distribution either of carbon dioxide or of nitrogen dioxide to the cathode of the other of the two elementary cells.

Thus, process for simultaneous but separate electrolysis of steam and of the other gas according to the invention differs from a process of co-electrolysis according to the prior art (IV), according to which steam and carbon dioxide were mixed at the inlet of an electrolyzer, the mixture supplying and being distributed in each elementary electrolysis cell.

With the process of the invention, it is notably possible to obtain a variable ratio between the outgoing gases produced $H_2/CO$ or $H_2/NO$, regardless of whether the operating mode of a given electrolysis cell is exothermic or endothermic. Said ratio between the outgoing gases produced $H_2/CO$ or $H_2/NO$ may thus be adapted at will, depending on the type of synthesis gas that we wish to obtain (see Table 1 discussed in the preamble).

FIG. 3 shows schematically a high-temperature solid oxide electrolyzer (SOEC) according to the invention, allowing within it simultaneous electrolysis of steam and carbon dioxide, each electrolysis taking place separately in one of the elementary electrolysis cells.

More precisely, the process for high-temperature electrolysis of steam $H_2O$ and carbon dioxide $CO_2$ according to the invention is implemented with the electrolysis reactor comprising a stack of elementary electrolysis cells of the SOEC type (C1, C2, C3) each formed from a cathode (2.1, 2.2, 2.3), an anode (4.1, 4.2, 4.3) and an electrolyte (3.1, 3.2, 3.3), interposed between the cathode and the anode, and a plurality of electrical and fluidic interconnectors (5) each arranged between two adjacent elementary cells with one of its faces in electrical contact with the anode of one of the two elementary cells and the other of its faces in electrical contact with the cathode of the other of the two elementary cells. As illustrated in FIG. 3, steam is supplied and distributed to the cathode 2.1, 2.3 of one (C1 or C3) of the two adjacent elementary cells (C1, C2; C2, C3) and carbon dioxide is supplied and distributed to the cathode 2.2 of the other (C2) of the two elementary cells (C1, C2; C2, C3).

In the reactor according to the invention, all the cathode compartments 50, in which the steam supplied $H_2O$ and the hydrogen produced $H_2$ circulate, communicate with one another. Moreover, all the cathode compartments 50 in which the carbon dioxide injected $CO_2$ and the carbon monoxide produced CO circulate, communicate with one another, but are completely isolated from the compartments 50 dedicated for steam $H_2O$ and for the hydrogen produced $H_2$. Finally, the two simultaneous but separate electrolysis reactions both produce oxygen, which is collected by all the anode compartments 51, which communicate with one another, regardless of the reaction involved.

Thus, according to the invention, steam is supplied and distributed, producing hydrogen in cathode compartments separate from those that are supplied with carbon dioxide $CO_2$, producing carbon monoxide, and all the oxygen produced by the two electrolysis reactions in anode compartments is recovered.

Instead of carrying out electrolysis of carbon dioxide, it is possible, according to the invention, to perform electrolysis of nitrogen dioxide to produce a gas $H_2$+NO at electrolysis reactor outlet a gas intended for ammonia production. Such a process, carried out in the same way as for the simultaneous but separate processes for electrolysis of steam and carbon dioxide, is illustrated schematically in FIG. 4.

FIG. 5 shows an exploded view of an interconnector 5 according to the invention for simultaneous supply of steam $H_2O$ and carbon dioxide $CO_2$ as well as recovery of oxygen $O_2$, carbon monoxide CO and oxygen $O_2$ respectively, produced in the stack of an electrolysis reactor. As detailed later, the interconnector 5 provides circulation of the gas ($H_2O/H_2$ or $CO_2/CO$) to the cathodes of the cells with cross-flow at 90° with the circulation of the gas recovered ($O_2$, with draining gas if applicable) to the anodes of the cells.

The interconnector 5 consists of three flat sheets 6, 7, 8 elongated along two axes of symmetry (X, Y) orthogonal to one another, the flat sheets being stratified and assembled together by welding. A central sheet 7 is interposed between a first end sheet 6 and a second end sheet 8.

The first end sheet 6 is intended to come into mechanical contact with the plane of a cathode 2.2 of an elementary electrolysis cell (C2) and the second end sheet 8 is intended to come into mechanical contact with the plane of an anode 4.1 of an adjacent elementary electrolysis cell (C1), each of the two adjacent elementary electrolysis cells (C1, C2) of the SOEC type being formed from a cathode 2.1, 2.2, an anode 4.1, 4.2 and an electrolyte 3.1, 3.2 interposed between the cathode and the anode.

The implementation of the sheets 6, 7, 8 of the interconnector 5 dedicated to steam electrolysis and assembly thereof for carrying out the process of simultaneous electrolysis according to the invention is now described, referring to FIG. 5.

Each of the three flat sheets 6, 7, 8 comprises an unperforated central part 60, 70, 80 and is perforated, at the periphery of its central part, with at least five openings 61, 62, 63, 64, 65; 71, 72, 73, 74, 75; 81, 82, 83, 84, 85.

The first 61, 71, 81 to fourth 64, 74, 84 openings of each sheet are elongated over a length corresponding to a part of the length of the central part 60, 70, 80 along one of the X axes of the sheets and are distributed two by two on either side of said X axis.

The fifth 65, 75, 85 opening is elongated over a length roughly corresponding to the length of the central part 60, 70, 80 along the other of the Y axes.

The first end sheet 6 further comprises a sixth 66 and seventh 67 openings arranged symmetrically on either side of the X axis, within its first to fourth openings 61 to 64, and are elongated over a length roughly corresponding to the length of the central part along the X axis.

The second end sheet 8 further comprises a sixth opening 86 within its fifth opening 85, elongated over a length roughly corresponding to the length of the central part along said Y axis.

As can be seen from FIG. 5, the first 71, third 73, and fifth 75 openings in the central sheet 7 are broadened relative to the first 61, 81, third 63, 83 and fifth 65, 85 openings of each end sheet 6, 8, respectively.

The second 62, 72, 82 and fourth 64, 74, 84 openings of the three sheets are of dimensions roughly identical to one another.

All the broadened openings 71, 73, 75, 76 of the central sheet 7 comprise, in their broadened part, tongues of sheets 710 spaced apart, forming a comb. As illustrated in FIGS. 5A and 5B, each of the slits 711 defined between the edge of a broadened slit 71 and a tongue 710 or between two consecutive tongues opening onto one 66 of the interior openings of the first end sheet 6. The same applies to the broadened slit 73. For each of the broadened slits 75, 76, the slits between tongues of sheet thus defined open onto one of the openings 85, 86 of the second end sheet.

The stratification and assembly of the three sheets 6, 7, 8 with one another are carried out in such a way that:

the tongues of sheets form spacer frames between the first 6 and second 8 end sheets respectively between the first 61 and sixth 66 openings of the first end sheet 6, between the third 63 and seventh 67 openings of the first end sheet 6, and between the fifth 85 and sixth 86 openings of the second end sheets 8, each of the first to fifth 61 to 65 openings of one of the three sheets is in fluid communication individually respectively with one of the corresponding first to fifth 71 to 75 and 81 to 85 openings of the other two sheets 7, 8, the first opening 61 of the first end sheet 6 is in fluid communication with the sixth opening 66 of the first end sheet 6 via the first opening 71 of the central sheet 7, the third opening 63 of the first end sheet 6 is in fluid communication with the seventh opening 67 of the first end sheet 6 via the third opening 73 of the central sheet 7, the fifth 85 and sixth 86 openings of the second end sheet 8 are in fluid communication via the fifth opening 75 of the central sheet 7.

FIGS. 5A and 5B show in detail the implementation of the comb formed by the tongues of sheet 710 at the level of the broadened slit 71 of the central sheet and its arrangement between the two end sheets 6, 8 in order to allow supply of an electrolysis cell, in this case with steam $H_2O$. Thus, the comb formed 710, 711 allows steam to pass from the supply manifold 61, 71, 81 to the distribution slit 66, passing through the space between the two end sheets 6, 8. The thickness of the central sheet 7 at the level of this comb 710, 711 endows it with a bracing function and thus guarantees the height of the passage for steam in the space between the end sheets 6, 8. Said passage of the gases according to the invention through the interior of the interconnector 5 has the advantage of releasing a flat surface to provide sealing. Moreover, owing to these comb shapes for the broadened slits 71, 75, there is homogeneous distribution of each gas ($H_2O$, $CO_2$, Air) to the electrolysis cell, and owing to these comb shapes for the broadened slits 73, 76 there is recovery of the gas produced ($H_2$, CO, $O_2$). These distributions or recoveries, which are homogeneous or, to put it another way, of uniform flow rate, are shown in FIGS. 6A to 7C, in the form of small arrows spaced apart.

The interconnector 5 shown in FIG. 5 is dedicated to steam electrolysis, as stated below. To construct an interconnector 5 with the same three flat sheets 6, 7, 8 but dedicated to the electrolysis of carbon dioxide $CO_2$, the same three sheets 6, 7, 8 that have just been described are used, and the central sheet 7 is turned upside down, then stratification and assembly of the three sheets 6, 7, 8 with one another are carried out in such a way that:

each of the first to fifth openings 61 to 65 of one of the three sheets is in fluid communication individually respectively with one of the corresponding first to fifth 71 to 75 and 81 to 85 openings of the other two sheets 7, 8, the second opening 62 of the first end sheet 6 is in fluid communication with the sixth opening 66 of the first end sheet 6 via the first opening 71 of the central sheet 7, the fourth opening 64 of the first end sheet 6 is in fluid communication with the seventh opening 67 of the first end sheet 6 via the third opening 73 of the central sheet 7, the fifth 85 and sixth 86 openings of the second end sheet 8 are in fluid communication via the fifth opening 75 of the central sheet 7.

According to an advantageous embodiment, when we wish to supply the anodes with a draining gas to evacuate the oxygen collected, additional openings are made in sheets 6, 7, 8.

Thus, according to this advantageous embodiment:

the first end sheet 6 further comprises an eighth opening 68 elongated over a length roughly corresponding to the length of the central part along the other of the Y axes and arranged opposite its fifth opening 65 relative to the Y axis, the second end sheet 8 further comprises a seventh opening 87 elongated over a length roughly corresponding to the length of the central part along the other of the Y axes and arranged opposite its fifth opening 85 relative to the Y axis, and an eighth opening 88 elongated over a length roughly corresponding to the length of the central part along said Y axis, and arranged opposite its sixth opening 86 relative to the Y axis, the central sheet 7 further comprises a sixth opening 76 broadened relative to the eighth 68 of the first end sheet 6 and to the seventh opening 87 of the second end sheet 8, the three sheets are assembled together in such a way that the seventh 87 and eighth 88 openings elongated along the Y axis of the second end sheet 8 are in fluid communication via the sixth opening 76 of the central sheet 7.

This embodiment for recovering the oxygen with a draining gas is additionally advantageous as it means having only a single type of sheets to be fabricated both for making an interconnector 5 dedicated to steam electrolysis and to electrolysis of carbon dioxide. In fact, depending on the gas to be electrolyzed at the level of a given electrolysis cell, the central sheet 7 must be placed in one or other direction, i.e. turned upside down, between the two end sheets 6, 8 to be assembled so as to constitute either an interconnector 5 dedicated to the electrolysis of steam $H_2O$, or an interconnector 5 dedicated to the electrolysis of $CO_2$. Thus, depending on the direction of placement of the central sheet 7, its broadened openings 71, 73 are located opposite the openings 61, 63 and 81, 83 or opposite the openings 62, 82 and 64, 84.

In an electrolysis reactor with a stack of elementary electrolysis cells of the SOEC type according to the invention, the stack of the plurality of interconnectors 5 each arranged between two adjacent elementary cells is constructed with the first end sheet 6 in electrical contact with the cathode of one of the two elementary cells and the second end sheet 8 in electrical contact with the anode of the other of the two elementary cells. The assembly of the electrolysis cells is supplied in series with electric current and in parallel with the gases. As the nature of the materials allows simultaneous reactions of electrolysis of steam and of carbon dioxide, cells of the same nature of the solid oxide type are stacked.

For the interconnector 5 dedicated to the electrolysis of water, fluid communication is provided between on the one hand the first 61 and the sixth 66 openings of the first end sheet 6 and on the other hand the third 63 and the seventh 67 openings of the first end sheet 6 (FIGS. 6A and 7A).

For an adjacent interconnector 5, dedicated to the electrolysis of carbon dioxide, fluid communication is provided between on the one hand the second 62 and the sixth 66 openings of the first end sheet 6 and on the other hand the fourth 64 and the seventh 67 openings of the first end sheet 6 (FIGS. 6B and 7B).

Thus, in an interconnector 5 according to the invention, there are two categories of openings:

a first category of openings; intended either for supplying or for recovering the whole of the stack of cells for electrolysis of water and of $CO_2$, and which form a part of the tubes passing through the assembly of interconnectors 5, usually called inlet or outlet manifolds;

a second category of openings intended either for distributing each feed gas or draining gas on each electrolysis cell from a manifold, or for recovering the gases produced from each electrolysis cell.

Thus, in the first category, the openings 61, 81; 62.72, 82; 64, 74, 84; 65, 85; form a part of a gas supply manifold ($H_2O$, $CO_2$ or Air) whereas the openings 63, 83; 68, 87 form a part of a manifold for recovery of gas produced ($H_2$, CO or $O_2$).

In the second category, the openings 66, 71; 75, 86 form openings for distribution of feed gas or draining gas ($H_2O$, $CO_2$, Air) on an electrolysis cell, whereas the openings 67, 73; 76, 88 form openings for recovery of the gases produced in a cell.

The three flat sheets 6, 7, 8 constituting an interconnector 5 according to the invention are thin, flat metal sheets, perforated and assembled together with welds. Preferably, the thin sheets are sheets with thickness of less than 3 mm, typically of the order of 0.2 mm. All the welds between sheets made during fabrication, away from any operation of the electrolyzer, may advantageously be made by a transparent laser technique, which is possible owing to the small thickness of the thin sheets, typically of the order of 0.2 mm.

All the sheets are advantageously of ferritic steel with of the order of 20% chromium, preferably of CROFER® 22APU or FT18TNb, nickel-based of the Inconel® 600 or Haynes® type, in thicknesses typically between 0.1 and 1 mm.

Assembly by lines of welds ls around the openings between flat sheets 6, 7, 8 guarantees good hermeticity between the steam supplied $H_2O$, carbon dioxide $CO_2$ and hydrogen $H_2$, the carbon monoxide CO produced and recovered, during operation of the electrolyzer.

As illustrated in all of FIGS. 3 to 9, the three sheets 6, 7, 8 are perforated at their periphery with additional openings 69, 79, 89 suitable for housing fixing tie rods. These fixing tie rods make it possible to apply a holding force on the stack of the various components of the electrolysis reactor.

The method of operation of an electrolysis reactor according to the invention as has just been described, is now described, referring to FIGS. 6A to 7C:

the first openings 61, 71, 81 are supplied with steam and simultaneously the second openings 62, 72, 82 are supplied with carbon dioxide $CO_2$, the eighth opening 68 of the first end sheet 6, the sixth opening 76 of the central sheet 7 and the seventh opening 87 of the second end sheet 8 are supplied with a draining gas, such as air, the hydrogen produced by steam electrolysis is recovered from the third openings 63, 73, 83 and simultaneously the carbon monoxide produced by electrolysis of the other gas is recovered from the fourth openings 64, 74, 84 and simultaneously oxygen with its draining gas produced both by electrolysis of steam and of carbon monoxide CO is recovered in the fifth openings 65, 75, 85.

The path of the steam injected and of the hydrogen produced within an interconnector 5 is shown schematically in FIGS. 6A and 7A.

The path of the carbon dioxide $CO_2$ injected and of the carbon monoxide produced within an interconnector 5 is shown schematically in FIGS. 6B and 7B.

The path of the air injected as draining gas and of the oxygen produced within an interconnector 5 is shown schematically in FIGS. 6C and 7C.

The electrolysis reactor according to the invention with a stack of several interconnectors 5 that has just been described makes it possible to couple, without mixing gases, the thermal management of the two reactions of electrolysis, i.e. of steam and of carbon dioxide.

Thus, thermal management of the $H_2O/H_2$ electrolysis reaction is possible by varying the resistance of the electrolysis cells dedicated to the other reaction, i.e. the $CO_2/CO$ electrolysis reaction. When the elementary electrolysis cells are of the cathode-supported type (CSC), just variation of the surface area of the oxygen electrode may be envisaged, thus varying the active surface area of the $CO_2/CO$ electrolysis cells, without modifying any other component of the stack within the reactor. Other variants may be envisaged for varying the resistance of the cells intended for the $CO_2/CO$ electrolysis reaction, including:

dimension of electrical contact,
decrease in electrolyte thickness,
varying the degree of utilization of the $CO_2$ inlet gas,
varying the inlet temperature of the $CO_2$ gas.

With the electrolysis reactor according to the invention and active surfaces of $H_2O/H_2$ electrolysis cells different from those of the $CO_2/CO$ electrolysis cells, it is possible to pass from an endothermic or exothermic operating mode for the $H_2O/H_2$ electrolysis reaction just by reversing the feeds of $H_2O$ and $CO_2$, for optional supply to the smaller or the larger electrolysis cells.

FIGS. 8 and 9 show exploded views of a part of the electrolysis reactors according to the invention with electrolysis cells with different surface area depending on whether they are dedicated to the electrolysis of water or of steam. It is to be noted here that these figures additionally show perforated sealing frames 9, their openings 99 suitable for housing tie rods for fixing the stack, as well as seals 90 for providing hermeticity around the openings for feed of the gases $H_2O$, $CO_2$, Air and for recovery of the gases produced $H_2$, CO, $O_2$ with Air. Seals 10 provided at the periphery of the anodes 4 for ensuring hermeticity of the oxygen produced are also shown. The same electric current passes through all of the electrolysis cells C1 to C3.

FIG. 8 illustrates a variant according to which the electrolysis cells C1, C3, identical to one another and dedicated to the electrolysis of carbon dioxide, have a lower active surface area than the electrolysis cell C2 dedicated to steam electrolysis, the cell C2 being interposed between the two cells C1, C3. With such a configuration, it is possible to manage the endothermic nature of the $H_2O/H_2$ electrolysis reaction in cell C2 below 1.3V by forcing exothermic nature of the $CO_2/CO$ electrolysis reaction.

In contrast to FIG. 8, FIG. 9 illustrates a variant according to which the electrolysis cells C1, C3, identical to one another and dedicated to the electrolysis of carbon dioxide, have a larger active surface area than electrolysis cell C2 dedicated to steam electrolysis, cell C2 being interposed between the two cells C1, C3. With such a configuration, exothermic operation of the $H_2O/H_2$ electrolysis reaction may be obtained above 1.3V by forcing endothermic nature of the $CO_2/CO$ electrolysis reaction.

The ratio of surface area between cells C1, C3 and cell C2 that we wish to obtain depends on the operating point and on the type of these cells.

Thus, according to the invention, an operating regime in exothermic mode may be defined for steam electrolysis at the cathode of one of the two adjacent elementary cells and simultaneously an operating regime in endothermic mode is established for electrolysis of carbon dioxide or nitrogen dioxide at the cathode of the other of the two adjacent elementary cells, the heat released by steam electrolysis being able to supply, at least partly, the heat required by the electrolysis of carbon dioxide or of nitrogen dioxide.

Alternatively, an operating regime in exothermic mode may be defined for electrolysis of carbon dioxide or nitrogen dioxide at the cathode at the cathode of one of the two adjacent elementary cells and simultaneously an operating regime in endothermic mode is established for steam electrolysis of the other of the two adjacent elementary cells, the heat released by the electrolysis of carbon dioxide or nitrogen dioxide being able to supply, at least partly, the heat required by the steam electrolysis.

To validate the variation of the ratio of surface area between electrolysis cells, simulations were carried out using a laboratory model, on commercial cathode-supported cells defined in Table 2 above. This model for laboratory simulation was described in the publication [1], FIGS. 10A and 10B illustrate the polarization curves obtained in electrolysis of carbon dioxide and of water, respectively. It is to be noted that the cathode-supported electrolysis cell on which the simulations were performed is at a temperature of 800° C. It is also to be noted that the $CO_2/CO$ ratio at cell inlet was 90/10 (FIG. 10A), just like the $H_2O/H_2$ ratio at cell inlet (FIG. 10B).

The heat fluxes of the two electrolysis reactions were also calculated as a function of the polarization of the cells and are illustrated in FIG. 11.

Based on the results obtained, the net heat fluxes corresponding to the sum of the terms relating to electrolysis of water and of $CO_2$ were calculated for two operating modes of the cell supplied with steam and whose surface area was fixed at 100 $cm^2$. The first operating mode corresponds to an exothermic mode at a voltage of 1.5 V whereas the second mode corresponds to an endothermic mode at 1.2 V.

The heat fluxes W calculated for the first and second modes as a function of the ratio of the surface areas between cells supplied with $CO_2$ and $H_2O$ respectively are presented in FIGS. 12A and 12B respectively.

It can be deduced from FIG. 12A that to ensure autothermal operation of the whole of the stacked electrolysis reactor, a ratio of surface area between electrolysis cells C1, C2 of about 2.5 is required when the electrolysis cell under water C2 operates in exothermic mode at 1.5 V.

This ratio of surface area required between electrolysis cells C1, C2 decreases to 0.6 when cell C2 operates in endothermic mode at 1.2 V (FIG. 12B).

The invention is not limited to the examples that have just been described; notably, features of the examples illustrated may be combined with one another in variants that are not illustrated.

Thus, in the embodiment shown in FIG. 13, where supply of a draining gas for recovery of the oxygen produced is not provided, i.e. a mode according to which sheets 6, 7, 8 do not have to be perforated with openings 68, 76, 87 and 88 respectively, it is necessary, in addition to turning the central sheet 7 upside down, to make the openings 65, 75, 85, 86 for recovery of the oxygen produced, opposite those shown in FIG. 5, relative to the Y axis.

Moreover, although an electrolysis reactor with a plurality of interconnectors 5 according to the invention is envisaged for carrying out the process of simultaneous and separate electrolysis of steam and of carbon dioxide according to the invention, it may also be used either just for electrolysis of steam or just for electrolysis of carbon dioxide.

For carrying out only electrolysis of water, the method of operation of the reactor is carried out as follows:

only the first 61, 71, 81 or alternatively the second 62, 72, 82 openings are supplied with steam,
the hydrogen produced by steam electrolysis is recovered in the third 63, 73, 83 or alternatively the fourth 64, 74, 84 openings and simultaneously the oxygen produced by steam electrolysis is recovered in the fifth 65, 75, 85 openings.

For carrying out only electrolysis of carbon dioxide, the method of operation of the reactor is carried out as follows:

only the first 61, 71, 81 or alternatively the second 62, 72, 82 openings are supplied with carbon dioxide $CO_2$,
carbon monoxide produced by electrolysis of the other gas is recovered in the third 63, 73, 83 or alternatively the fourth 64, 74, 84 openings and simultaneously the oxygen produced by electrolysis of the other gas is recovered in the fifth 65, 75, 85 openings.

REFERENCE CITED

[1]: J. Laurencin et al., "*Modeling of solid steam electro-lyzes: Impact of the operating conditions on hydrogen productions*", Journal of Power Source 196 (2011) 2080-2093

The invention claimed is:

1. A method for high-temperature electrolysis of steam $H_2O$ and of another gas to be electrolyzed selected from carbon dioxide $CO_2$ and nitrogen dioxide $NO_2$, carried out in an electrolysis reactor comprising a stack of elementary electrolysis solid oxides cells each formed from a cathode, an anode and an electrolyte interposed between the cathode and the anode, and a plurality of electrical and fluidic interconnectors each arranged between two adjacent elementary cells with one of its faces in electrical contact with the anode of one of the two elementary cells and the other of its faces in electrical contact with the cathode of the other of the two elementary cells, comprising the following steps:
  supplying and distributing steam to the cathode of one of the two adjacent elementary cells and,
  supplying and distributing either carbon dioxide or nitrogen dioxide to the cathode of the other of the two elementary cells.

2. The method of electrolysis as claimed in claim 1, comprising the steps:
  defining an operating regime in exothermic mode for steam electrolysis at the cathode of one of the two adjacent elementary cells and simultaneously,
  establishing an operating regime in endothermic mode for electrolysis of carbon dioxide or nitrogen dioxide at the cathode of the other of the two adjacent elementary cells,
  wherein the heat released by steam electrolysis is able to supply, at least partly, the heat required by the electrolysis of carbon dioxide or of nitrogen dioxide.

3. The method of electrolysis as claimed in claim 1, comprising the steps:
  defining an operating regime in exothermic mode for electrolysis of carbon dioxide or nitrogen dioxide at the cathode of one of the two adjacent elementary cells and simultaneously,
  establishing an operating regime in endothermic mode for steam electrolysis of the other of the two adjacent elementary cells,
  wherein the heat released by the electrolysis of carbon dioxide or nitrogen dioxide being able to supply, at least partly, the heat required by the steam electrolysis.

4. A device forming an electrical and fluidic interconnector for high-temperature electrolysis of steam and another gas to be electrolyzed selected from carbon dioxide $CO_2$ and nitrogen dioxide $NO_2$, said device consisting of three flat sheets, elongated along two axes of symmetry (X, Y) orthogonal to one another, one of the end sheets being intended to come into mechanical contact with the plane of a cathode of an elementary electrolysis cell and the other of the end sheets being intended to come into mechanical contact with the plane of an anode of an adjacent elementary electrolysis cell, each of the two adjacent elementary electrolysis solid oxides cells being formed from a cathode, an anode, and an electrolyte interposed between the cathode and the anode, wherein in said device each of the three flat sheets comprises an unperforated central part and is perforated, at the periphery of its central part, with at least five openings, the first to fourth openings of each sheet being elongated over a length corresponding to a part of the length of the central part along one of the X axes of the sheets and being distributed two by two on either side of said X axis, whereas the fifth opening is elongated over a length roughly corresponding to the length of the central part along the other of the Y axes, one of the end sheets, called first end sheet, further comprises a sixth and seventh openings arranged symmetrically on either side of the X axis, within its first to fourth openings, and are elongated over a length roughly corresponding to the length of the central part along the X axis, whereas the other of the end sheets, called second end sheet, further comprises a sixth opening, and elongated over a length roughly corresponding to the length of the central part along said Y axis, and, the first, third, and fifth openings in the central sheet being broadened relative to, respectively, the first, third and fifth openings of each end sheet, whereas the second and fourth openings of the three sheets are of dimensions roughly identical to one another, all the broadened openings of the central sheet comprise, in their broadened part, tongues of sheets spaced apart forming a comb, each of the slits defined between the edge of a broadened slit and a tongue or between two consecutive tongues opening onto one of the interior openings of the first or second end sheet, the three sheets are stratified and assembled together so that:
  the tongues of sheets form spacer frames between first and second end sheets respectively between the first and sixth openings of the first end sheet, between the third and seventh openings of the first end sheet, and between the fifth and sixth openings of the second end sheets,
  each of the first to fifth openings of one of the three sheets is in fluid communication individually respectively with one of the corresponding first to fifth openings of the other two sheets,
  the first or alternatively the second opening of the first end sheet is in fluid communication with the sixth opening of the first end sheet via the slits of the first broadened opening of the central sheet,
  the third or alternatively the fourth opening of the first end sheet is in fluid communication with the seventh opening of the first end sheet via the slits of the third broadened opening of the central sheet,
  the fifth and the sixth openings of the second end sheet are in fluid communication via the slits of the fifth broadened opening of the central sheet.

5. The electrical and fluidic interconnector as claimed in claim 4, wherein:
  the first end sheet further comprises an eighth opening elongated over a length roughly corresponding to the length of the central part along the other of the Y axes and arranged opposite its fifth opening relative to the Y axis,
  the second end sheet further comprises a seventh opening elongated over a length roughly corresponding to the length of the central part along the other of the Y axes and arranged opposite its fifth opening relative to the Y axis, and an eighth opening elongated over a length roughly corresponding to the length of the central part along said Y axis, and arranged opposite its sixth opening relative to the Y axis, the central sheet further comprises a sixth opening broadened relative to the eighth of the first end sheet and to the seventh opening of the second end sheet, the three sheets are assembled together in such a way that the seventh and eighth openings elongated along the Y axis of the second end sheet are in fluid communication via the sixth opening of the central sheet.

6. The electrical and fluidic interconnector as claimed in claim 4, wherein the three sheets are assembled together by welding or brazing.

7. The electrical and fluidic interconnector as claimed in claim 4, wherein the three sheets are assembled together by weld lines (ls) closed individually around each fluid communication.

8. The electrical and fluidic interconnector as claimed in claim 4, wherein the three sheets are of ferritic steel at about 20% chromium.

9. The electrical and fluidic interconnector as claimed in claim 4, wherein each of the three sheets has a thickness between 0.1 and 1 mm.

10. The electrical and fluidic interconnector as claimed in claim 4, wherein the three sheets are perforated at their periphery with additional openings suitable for housing fixing tie rods.

11. An electrolysis reactor comprising a stack of elementary electrolysis solid oxides cells each formed from a cathode, an anode and an electrolyte interposed between the cathode and the anode, and a plurality of electrical and fluidic interconnectors as claimed in claim 4, each arranged between two adjacent elementary cells with the first end sheet in electrical contact with the cathode of one of the two elementary cells and the second end sheet in electrical contact with the anode of the other of the two elementary cells, wherein, in one of two adjacent interconnectors, fluid communication is provided between on the one hand the first and sixth openings of the first end sheet and on the other hand the third and seventh openings of the first end sheet, whereas in the other of the two adjacent interconnectors, fluid communication is provided between on the one hand the second and sixth openings of the first end sheet and on the other hand the fourth and seventh openings of the first end sheet.

12. The electrolysis reactor as claimed in claim 11, wherein the electrical resistance of one of the two adjacent elementary cells is different from the electrical resistance of the other of the two adjacent elementary cells.

13. The electrolysis reactor as claimed in claim 11, wherein the active surface area of at least one electrode of the two adjacent elementary cells is different from the active surface area of at least one electrode of the other of the adjacent elementary cells.

14. The electrolysis reactor as claimed in claim 11, in which the elementary electrolysis cells are of the supported-cathode type, the active surface area of the anode of one of the two adjacent elementary cells is different from the active surface area of the anode of the other of the two adjacent elementary cells.

15. A method of operation of an electrolysis reactor as claimed in claim 11, wherein:

the first openings are supplied with steam and simultaneously the second openings are supplied with another gas to be electrolyzed selected from carbon dioxide $CO_2$ and nitrogen dioxide $NO_2$, the hydrogen produced by steam electrolysis is recovered in the third openings and simultaneously carbon monoxide or nitrogen monoxide produced by the electrolysis of the other gas is recovered in the fourth openings and simultaneously oxygen produced both by electrolysis of steam and of the other gas, is recovered in the fifth openings.

16. The method of operation as claimed in claim 15, wherein the hydrogen produced and recovered in the third or alternatively the fourth openings is mixed at the outlet of the electrolysis reactor with the carbon monoxide produced and recovered in the fourth or alternatively the third openings, to produce a synthesis gas with a view to performing either a synthesis according to the Fischer-Tropsch process followed by hydrocracking to produce liquid fuel of diesel or kerosene, or synthesis of methane, or synthesis of methanol, or synthesis of dimethyl ether (DME).

17. The method of operation as claimed in claim 15, wherein the hydrogen produced and recovered in the third or alternatively the fourth openings is mixed at the outlet of the electrolysis reactor with the nitrogen monoxide produced and recovered in the fourth or alternatively the third openings, to produce a gas with a view to performing synthesis of ammonia $NH_3$.

18. The method of operation as claimed in claim 15, according to which in addition the eighth opening of the first end sheet, the sixth opening of the central sheet and the seventh opening of the second end sheet are supplied with a draining gas.

19. A method of operation of an electrolysis reactor as claimed in claim 11, wherein:

the second openings are supplied with steam and simultaneously the first openings are supplied with another gas to be electrolyzed selected from carbon dioxide $CO_2$ and nitrogen dioxide $NO_2$, the hydrogen produced by steam electrolysis is recovered in the fourth openings and simultaneously carbon monoxide or nitrogen monoxide produced by electrolysis of the other gas is recovered in the third openings and simultaneously the oxygen produced both by electrolysis of steam and of the other gas is recovered in the fifth openings.

20. A method of operation of an electrolysis reactor as claimed in claim 11, wherein:

only the first or alternatively the second openings are supplied with steam, hydrogen produced by steam electrolysis is recovered in the third or alternatively the fourth openings and simultaneously oxygen produced by steam electrolysis is recovered in the fifth openings.

21. A method of operation of an electrolysis reactor as claimed in claim 11, wherein:

only the first or alternatively the second openings are supplied with another gas to be electrolyzed selected from carbon dioxide $CO_2$ and nitrogen dioxide $NO_2$, carbon monoxide or nitrogen monoxide produced by electrolysis of the other gas is recovered in the third or alternatively the fourth openings and simultaneously oxygen produced by electrolysis of the other gas is recovered in the fifth openings.

* * * * *